United States Patent
Oh

(10) Patent No.: US 7,266,667 B2
(45) Date of Patent: Sep. 4, 2007

(54) MEMORY ACCESS USING MULTIPLE SETS OF ADDRESS/DATA LINES

(75) Inventor: Jong-Hoon Oh, Chapel Hill, NC (US)

(73) Assignee: Infineon Technologies AG, Munich (DE)

(*) Notice: Subject to any disclaimer, the term of this patent is extended or adjusted under 35 U.S.C. 154(b) by 342 days.

(21) Appl. No.: 10/987,812

(22) Filed: Nov. 12, 2004

(65) Prior Publication Data

US 2006/0107026 A1    May 18, 2006

(51) Int. Cl.
*G06F 12/00* (2006.01)
(52) U.S. Cl. .................. 711/200; 711/212; 711/220; 710/4; 710/14; 710/26
(58) Field of Classification Search .............. None
See application file for complete search history.

(56) References Cited

U.S. PATENT DOCUMENTS

| | | |
|---|---|---|
| 5,872,944 A | 2/1999 | Goldrian et al. |
| 6,065,092 A | 5/2000 | Roy |
| 6,292,873 B1 | 9/2001 | Keaveny et al. |
| 6,397,313 B1 * | 5/2002 | Kasa et al. ............. 711/168 |
| 6,748,507 B2 * | 6/2004 | Kawasaki et al. ......... 711/167 |
| 6,763,448 B1 * | 7/2004 | Mitsuishi .................. 712/39 |

FOREIGN PATENT DOCUMENTS

WO    WO 01/42929    6/2001

OTHER PUBLICATIONS

PCT International Search Report and Written Opinion dated Mar. 10, 2006.

* cited by examiner

*Primary Examiner*—Jasmine Song
(74) *Attorney, Agent, or Firm*—Patterson & Sheridan, L.L.P.

(57) ABSTRACT

Methods and apparatus for accessing multiple memory arrays within a memory device using multiple sets of address/data lines are provided. The memory arrays may be accessed independently, using separate addresses, in one mode of operation, and accessed using a common single address in another mode of operation.

8 Claims, 8 Drawing Sheets

MEMORY ACCESS USING MULTIPLE SETS OF ADDRESS/DATA LINES

BACKGROUND

1. Field of the Invention

The invention generally relates to memory access.

2. Description of the Related Art

FIG. 1 illustrates a prior art memory system 100 comprising a memory controller 110 and a memory 120. Memory controller 110 is coupled to memory 120 by a set of address lines 112, a set of address/data lines 114, control lines 116, and a clock (CLK) line 118 to clock memory 120 for synchronous memory access.

With reference to a read access timing diagram 200 of FIG. 2, memory controller 110 requests a read access to memory 120 by outputting a high-order address portion ($A1_H$) over address lines 112, a low-order address portion ($A1_L$) over address/data lines 114, and a read command, an active address valid (/ADV) control signal, and an active chip enable (CE) control signal over control lines 116. Memory 120 latches address portions $A1_H$ and $A1_L$ in response to the active /ADV signal, accesses stored data words (D1, D2, D3, and D4) starting at the address A1 formed by concatenating address portions $A1_H$ and $A1_L$, and outputs data words D1, D2, D3, and D4 to memory controller 110 over address/data lines 114 in successive clock cycles.

Where memory 120 has an access latency of two clock cycles and where address/data lines 114 carry a 16-bit data word at a time, a single read access of 64 bits of data (four 16-bit data words) at address A1 is performed in six clock cycles. After completion of this read access and a precharge operation for memory 120, another access may be initiated to read another 64 bits of data at an address A2. As illustrated in FIG. 2, this second read access may be initiated eight clock cycles after the first read access is initiated. Four successive accesses to read 256 bits of data (16 16-bit data words) may therefore be performed in 30 clock cycles, that is 3×8 clock cycles for the first three accesses plus 6 clock cycles for the fourth access.

In some cases, the latency penalty incurred when accessing data at different memory locations (e.g., A1 and A2 above), because separate memory access operations are conventionally required, may be too great. Accordingly, what is needed are methods and apparatus for reducing access times to data at different memory locations.

SUMMARY

One or more embodiments provide a method for accessing a memory device having multiple address modes. The method generally includes, if a single address mode is selected, receiving multiple portions of a single address over first and second sets of lines, accessing first and second memory arrays of the memory device using the single address and using the first and second sets of lines to receive or transmit data. The method generally includes, if a multiple address mode is selected, receiving multiple portions of first and second addresses over the first and second sets of lines, accessing the first memory array using the first address and using the first set of lines to receive or transmit data, and accessing the second memory array using the second address and using the second set of lines to receive or transmit data.

One or more embodiments provide a method for accessing a memory device. The method generally includes receiving multiple portions of first and second addresses over first and second sets of lines, accessing a first memory array of the memory device using the first address and using the first set of lines to receive or transmit data, and accessing a second memory array of the memory device using the second address and using the second set of lines to receive or transmit data.

One or more embodiments provide an apparatus generally including first and second independently addressable memory arrays, first and second sets of address/data lines and control circuitry. In a first address mode, the control circuitry is generally configured to receive multiple portions of a single address over the first and second sets of address/data lines, access the first and second memory arrays of the memory device using the single address and using the first and second sets of address/data lines to receive or transmit data. In a second address mode, the control circuitry is generally configured to receive multiple portions of first and second addresses over the first and second sets of address/data lines, access the first memory array using the first address and using the first set of address/data lines to receive or transmit data, and accesse the second memory array using the second address and using the second set of address/data lines to receive or transmit data.

One or more embodiments provide an apparatus generally including first and second independently addressable memory arrays, circuitry to receive multiple portions of first and second addresses over first and second sets of lines, circuitry to access the first memory array using the first address and the first set of lines to receive or transmit data, and circuitry to access the second memory array using the second address and the second set of lines to receive or transmit data.

One or more embodiments provide a system generally including one or more processors, a memory controller, and a memory device. The memory device generally includes first and second memory arrays and circuitry. When the memory device is in a first mode of operation, the circuitry is generally configured to receive from the memory controller multiple portions of a single address over first and second sets of address/data lines, access the first and second memory arrays of the memory device using the single address and using the first and second sets of address/data lines to receive or transmit data. When the memory device is in a second mode of operation, the circuitry is generally configured to receive from the memory controller multiple portions of first and second addresses over the first and second sets of address/data lines, access the first memory array using the first address and using the first set of address/data lines to receive or transmit data, and accesse the second memory array using the second address and using the second set of address/data lines to receive or transmit data

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

Embodiments of the invention generally provide memory access using multiple sets of address/data lines to help increase data bandwidth to and from memory. One or more embodiments may help increase data bandwidth and therefore data throughput with a relatively minimal increase in the number of input/output (I/O) lines to/from memory.

According to some embodiments, a memory device may be configured (e.g., via hardware or software) to operate in either a single address mode or a multiple address mode. In the single address mode, a common single address provided over multiple sets of address/data lines may be used to access multiple memory arrays in the device, effectively accessing the multiple memory arrays as a single array. In the multiple address mode, multiple addresses may be provided over the multiple sets of address/data lines and used to access the multiple memory arrays independently. For example, for a memory device utilizing two 16-bit wide memory arrays, the device may be operated as a single 32-bit wide device (1×32) in the single-address mode or as multiple 16-bit wide devices (2×16) in the multiple-address mode.

An Exemplary System

Figure 1:
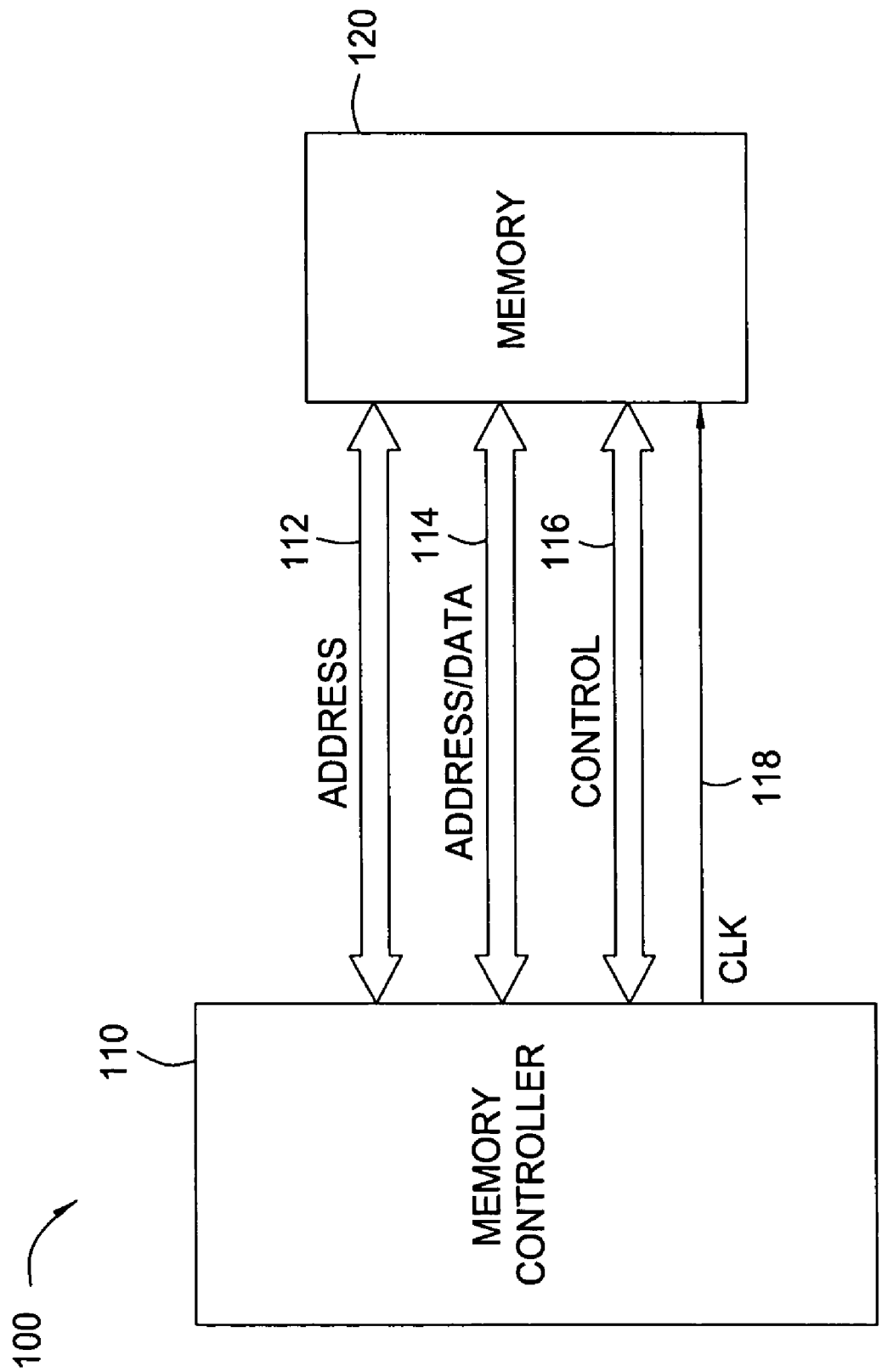
FIG. 1 illustrates a prior art memory system.
Figure 2:
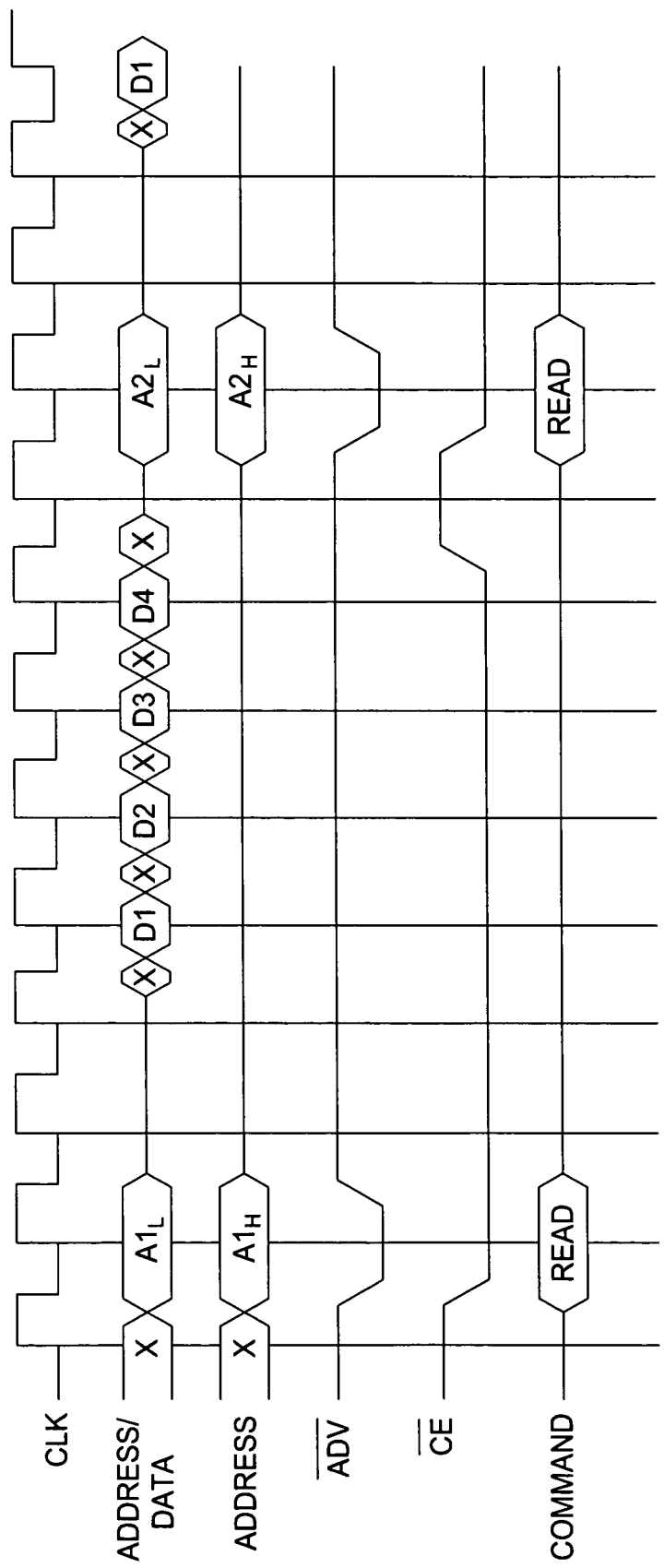
FIG. 2 illustrates a read access timing diagram for the memory system of FIG. 1.
Figure 3:
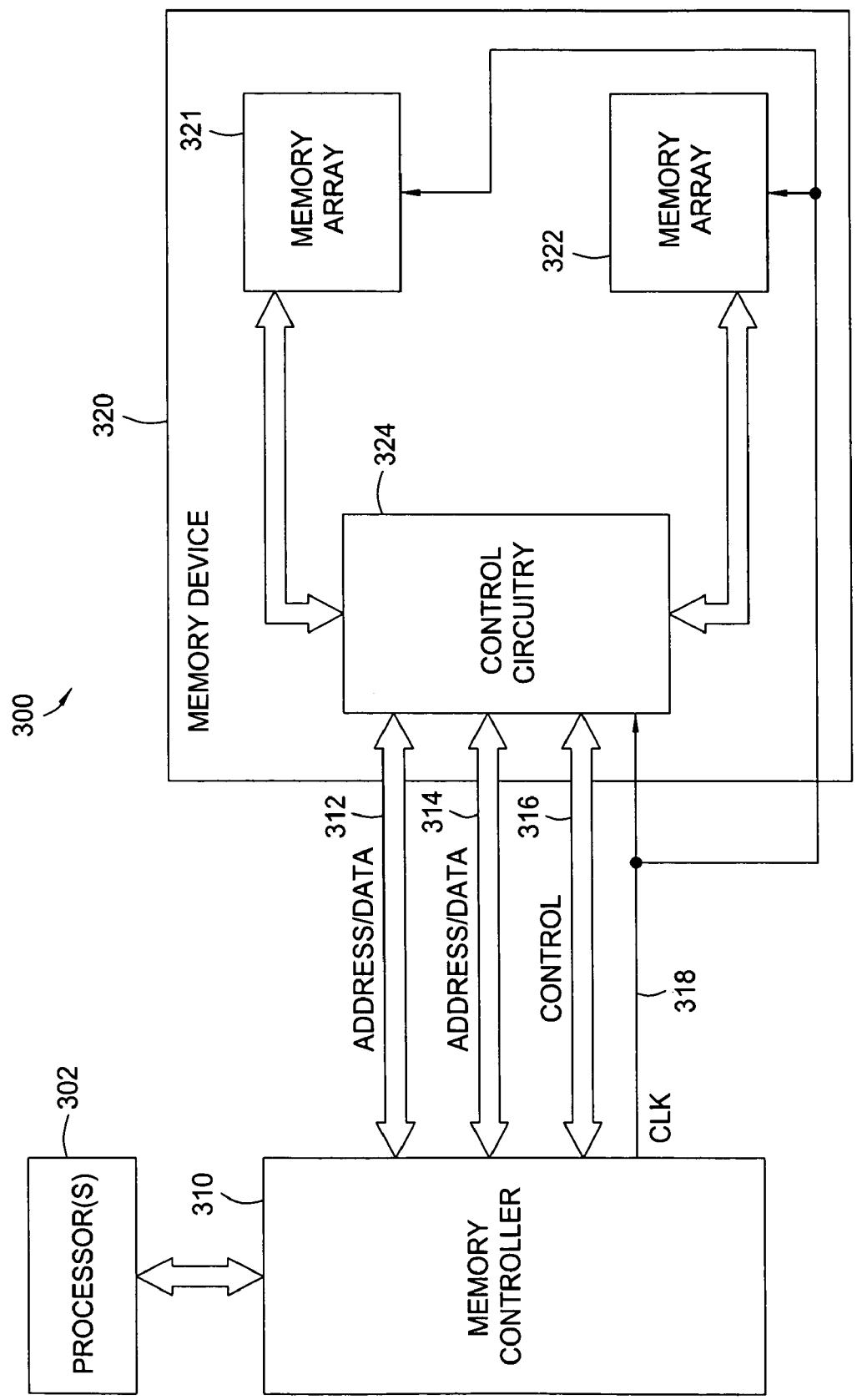
FIG. 3 illustrates, for one or more embodiments, a memory system with memory access using multiple sets of address/data lines.

FIG. 3 illustrates, for one or more embodiments, an example system 300 comprising one or more processors 302, a memory controller 310, and memory device 320 supporting access using multiple sets of address/data lines. Memory controller 310 for one or more embodiments may be coupled to processor(s) 302 and to memory device 320 to read data from and/or write data to memory device 320 for processor(s) 302.

Memory controller 310 for one or more embodiments may be coupled to memory device 320 by a first set of address/data lines 312, a second set of address/data lines 314, and control lines 316. Using multiple sets of address/data lines may help increase data bandwidth by helping to increase the amount of data that may be read from and/or written to memory device 320 at one time. Using multiple sets of address/data lines may therefore help increase data throughput. Also, sharing a set of lines for both addresses and data helps to reduce or minimize the number of input/output (I/O) lines to/from memory device 320.

Memory controller 310 for one embodiment may be integrated and/or packaged with one or more of processor(s) 302. Processor(s) 302, memory controller 310, and memory device 320 may be used in any suitable system for any suitable purpose, such as for a desktop computer, a laptop or notebook computer, a tablet computer, a handheld computer, a mobile computer, an ultra-personal computer (UPC), a personal digital assistant (PDA), a cellular telephone, or a smartphone for example. Although described in connection with interfacing with memory controller 310 in system 300, memory device 320 may interface with any suitable device in any suitable system.

Memory device 320 for one or more embodiments, as illustrated in FIG. 3, may comprise a first memory array 321, a second memory array 322, and control circuitry 324 coupled to access first memory array 321 and second memory array 322. Control circuitry 324 may be coupled to memory controller 310 by address/data lines 312, address/data lines 314, and control lines 316 to control access to first memory array 321 and/or second memory array 322 in response to one or more memory access requests from memory controller 310. First memory array 321 and second memory array 322 may comprise any suitable memory circuitry to receive, store, and transmit data for memory device 320. First memory array 321 and second memory array 322 may have any suitable type memory architectures, for example, a dynamic random access memory (DRAM) architecture, static random access memory (SRAM), pseudo-static random access memory (PSRAM), or a flash memory architecture. First memory array 321, second memory array 322, and control circuitry 324 for one or more embodiments may be packaged with one another. First memory array 321, second memory array 322, and control circuitry 324 for one or more embodiments may be formed on the same integrated circuit.

Memory device 320 for one or more embodiments may be coupled to receive a clock signal from memory controller 310 over a CLK line 318 to clock circuitry for first memory array 321, second memory array 322, and control circuitry 324 for synchronous access to memory device 320. Memory device 320 for one or more embodiments may alternatively be clocked from a clock source common to memory controller 310 and memory device 320 for synchronous memory access or from a clock source separate from that for memory controller 310 for asynchronous memory access.

Depending on the particular mode of operation, the control circuitry 324 may either generate the same address, or different addresses to access the memory arrays 321 and 322, respectively. For example, in what may be referred to as a "single-cycle" or single address mode, the control circuitry 324 may generate a single common address by concatenating first and second address portions latched from the address/data lines 312 and 314, respectively, in a single clock cycle. In what may be referred to as a "multiple-cycle" or multiple address mode, the control circuitry 324 may generate different addresses, with each address generated by concatenating address portions supplied via the address/data lines 312 and 314 in sequential clock cycles. In either case, data may be transferred to/from each memory array 321 and 322, via the address/data lines 312 and 314, respectively.

Memory Access Using Selectable Address ModekODE

Control circuitry 324 for one or more embodiments may allow selection (e.g., by memory controller 310) between such addressing modes (e.g., via one or more control signals) to access data in first memory array 321 and/or second memory array 322, helping to provide increased flexibility for memory controller 310 to access memory device 320.

Figure 4:
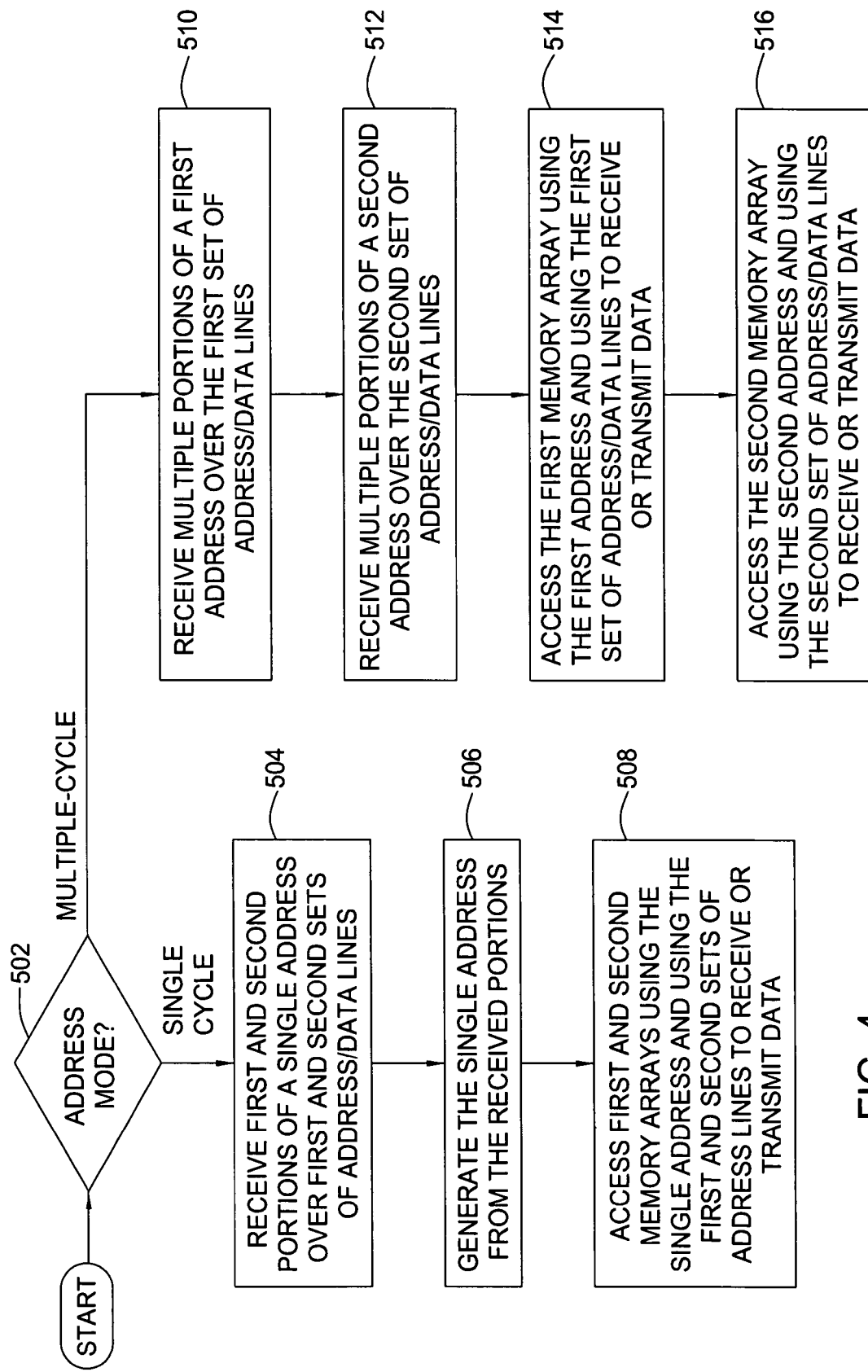
FIG. 4 illustrates, for one or more embodiments, a flow diagram for memory access using multiple sets of address/data lines.
Figure 5:
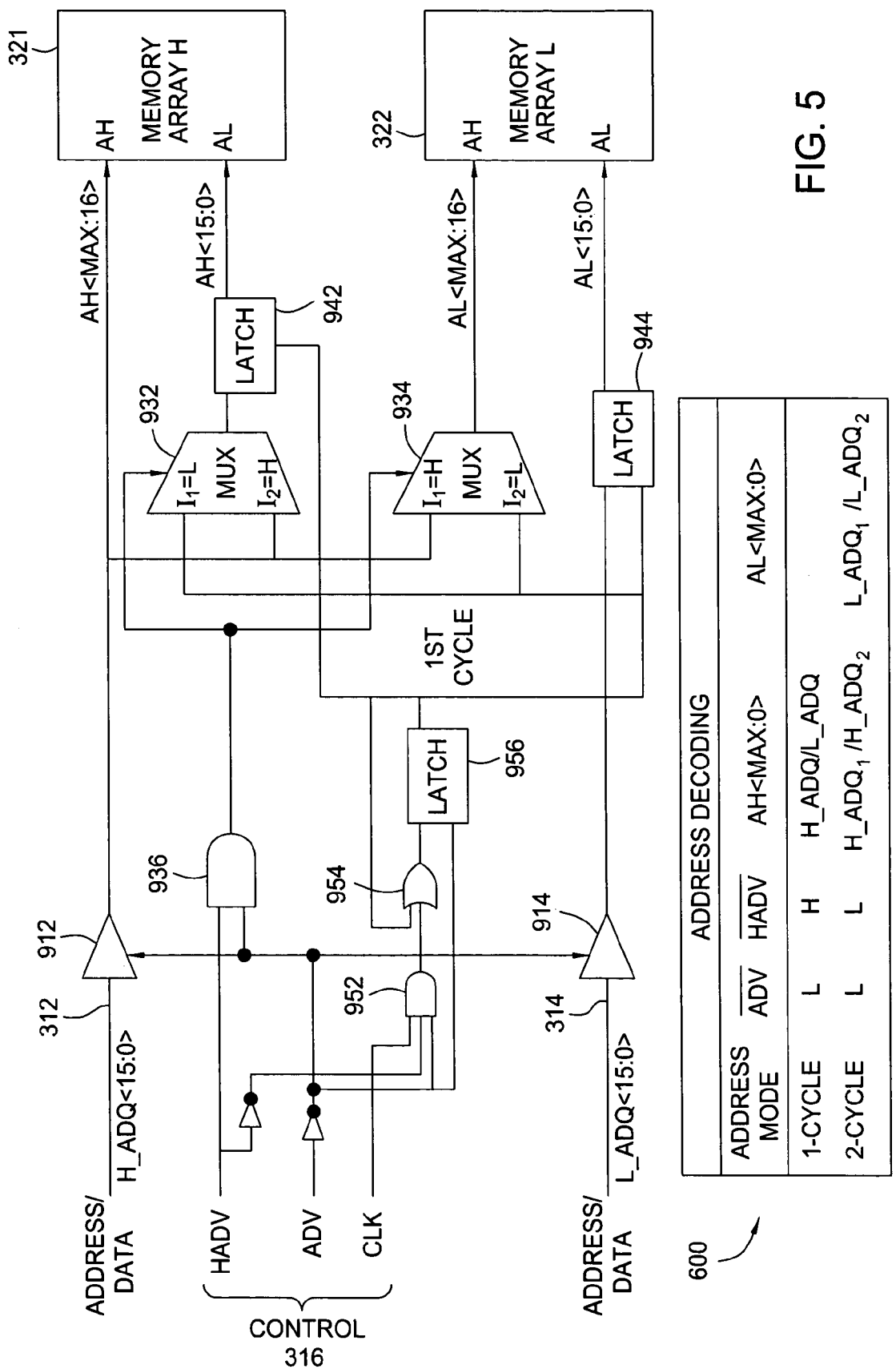
FIG. 5 illustrates, for one or more embodiments, circuitry to provide a selectable address mode for the memory device of FIG. 3.

Control circuitry 324 for one or more embodiments may control access to first memory array 321 and/or second memory array 322 in response to a memory access request having a selected address mode from memory controller 310 in accordance with a flow diagram 500 of FIG. 4. Control circuitry 324 for one or more embodiments may comprise address generation circuitry which is illustrated in FIG. 5 and which will be described in connection with flow diagram 500 of FIG. 4.

Referring now to FIG. 4, if memory controller 310 requests access to memory device 320 using a single-cycle address mode for block 502 of FIG. 4, control circuitry 324 controls access to first memory array 321 and second memory array 322 in accordance with blocks 504, 506, and 508. If memory controller 310 requests access to memory device 320 using a multiple address mode for block 502 of FIG. 4, control circuitry 324 controls access to first memory array 321 and second memory array 322 in accordance with blocks 510, 512, 514, and 516.

To select which address mode, control circuitry 324 for one or more embodiments may receive from memory controller 310 one or more control signals over control lines 316. For some embodiments, the memory controller 310 may select an address mode by asserting/de-asserting address valid signals (/ADV and /HADV) when accessing data. For example, as shown in Table 600 of FIG. 5, for some embodiments de-asserting the /HADV signal (e.g., maintaining it at a high logic level) during an access may select a single-cycle address mode, while asserting the /HADV signal (e.g., bringing it to a low logic level) during an access may select a two-cycle address mode.

Single-Cycle Address Mode

In single-cycle address mode, the memory arrays may be accessed as a single array having double width, using a single address. For example, assuming 16-bit arrays, in single-cycle address mode, the arrays may be considered and accessed as a single 32-bit array (1×32).

For single (or single-cycle) address mode, control circuitry 324 for block 504 of FIG. 4 receives first and second portions of a single address over first and second sets of address/data lines 312 and 314. For block 506, control circuitry 324 generates the single address from the received portions, for example, by concatenating the first and second address portions (e.g., utilizing address generation circuitry, such as that shown in FIG. 5). For block 508, control circuitry 324 accesses the first and second memory arrays 321 and 322 using the single address and receives or transmits data using the first and second sets of address/data lines 312 and 314.

As illustrated in FIG. 5, for single address mode (as identified by an inactive /HADV control signal), tristate gates 912 may be coupled to pass an address portion on address/data lines 312 to a high-order address input ($A_H$) of first memory array 321 and to a first input ($I_1$) of a multiplexer (MUX) 934 in response to an active address valid (/ADV) control signal received over control lines 316. Tristate gates 914 may be coupled to pass an address portion on address/data lines 314 to a low-order address input ($A_L$) of second memory array 322 and to a first input ($I_1$) of a multiplexer (MUX) 932 in response to the active /ADV control signal.

MUX 932 may be coupled to output the address portion on its first input ($I_1$) to a low-order address input ($A_L$) of first memory array 321 in response to the inactive /HADV control signal through an AND gate 936, thereby allowing concatenation of both address portions on address/data lines 312 and 314 to address first memory array 321. MUX 934 may be coupled to output the address portion on its first input ($I_1$) to a high-order address input ($A_H$) of second memory array 322 in response to the inactive /HADV control signal through AND gate 936, thereby allowing concatenation of both address portions on address/data lines 312 and 314 to address second memory array 322.

Figure 6:
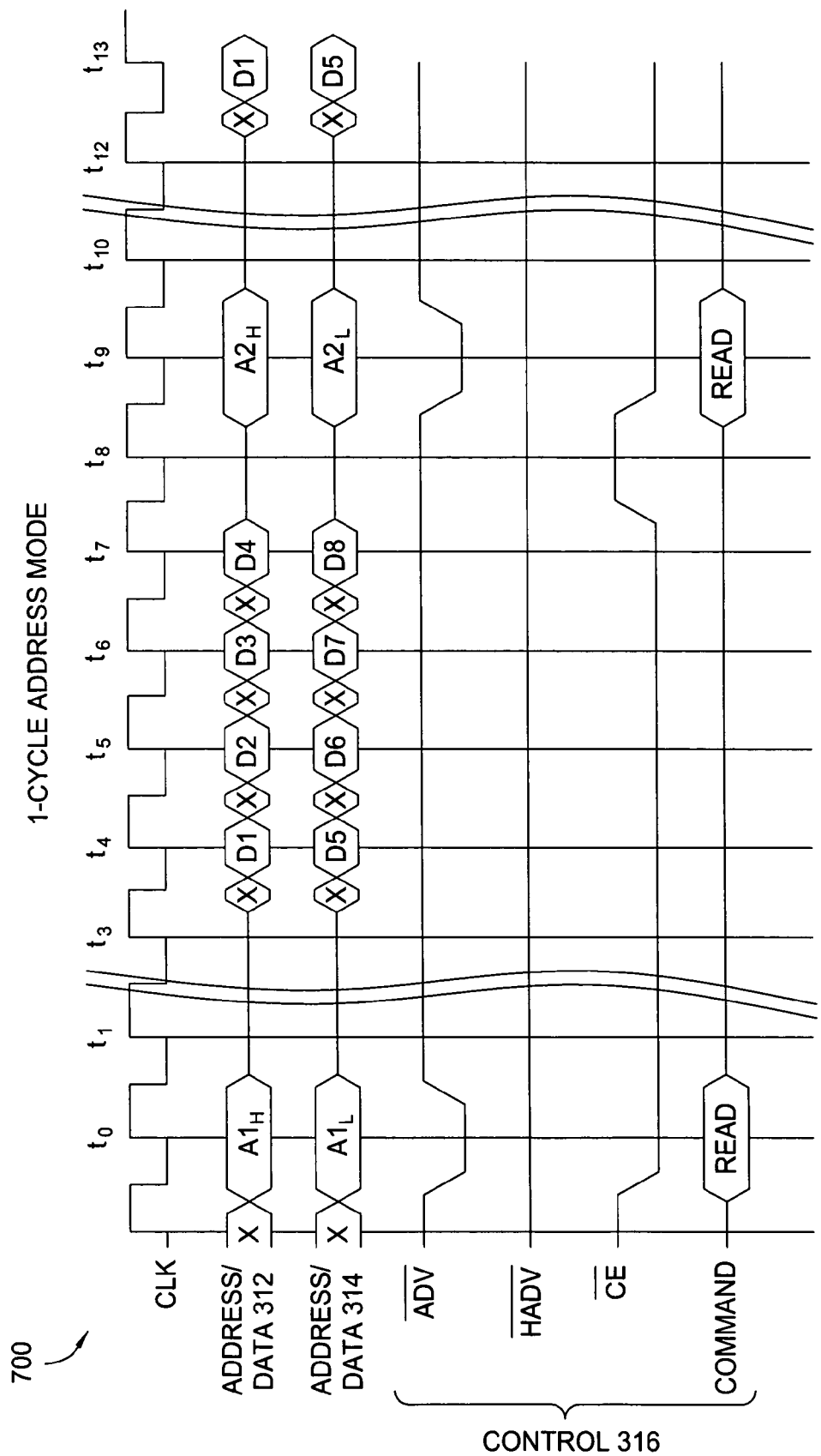
FIG. 6 illustrates, for one or more embodiments, an example single address read access timing diagram for the memory device of FIG. 3.

As illustrated in the timing diagram 700 of FIG. 6 for an exemplary read access using a single-cycle address mode, the first and second address portions of the single address may be clocked in concurrently on a single clock cycle. Assuming 16-bit memory arrays 321 and 322 and a 4-cycle latency after the read command at cycle t0, 16 bytes of data (128 bits total) may be accessed in 9 clock cycles. Further assuming a 2-cycle latency between reads, 32 bytes of data (e.g., with 16 bytes each coming from different address locations) may be accessed in 20 clock cycles.

Multiple-Cycle Address Mode

In multiple-cycle address mode, the memory arrays may be accessed independently, using separate addresses provided on the address/data lines 312-314. For example, again assuming 16-bit arrays, in multiple-cycle address mode, a memory device containing the arrays may be considered and accessed as two single 16-bit devices (2×16) which in some cases, as described below, may result in reduced latency.

Referring again to FIG. 4, for multiple address mode, control circuitry 324 for block 510 receives multiple portions of a first address over the first set of address/data lines 312 and, for block 512, receives multiple portions of a second address over the first set of address/data lines 312. For block 514, the first memory array is accessed using the first address (e.g., generated from the multiple portions utilizing circuitry such as that shown in FIG. 5) and using the first set of address/data lines 312 to receive or transmit data. For block 516, the second memory array is accessed using the second address and using the second set of address/data lines 312 to receive or transmit data.

For multiple address mode as identified by an active /HADV control signal, tristate gates 912 may be coupled to pass a first address portion on address/data lines 312 to a second input ($I_2$) of MUX 932 in response to an active /ADV control signal received over control lines 316. MUX 932 may be coupled to output the first address portion on its second input ($I_2$) to a latch 942 in response to the active /HADV control signal through AND gate 936. Latch 942 may be coupled to latch and output the first address portion to the low-order address input (AL) of first memory array 321 in response to the active /HADV control signal through AND gate 952, OR gate 954, and latch 956. Latch 942 may comprise, for example, D-type flip-flops, and latch 956 may comprise, for example, an SR flip-flop. Tristate gates 912 may be coupled to pass a second address portion on address/data lines 312 to the high-order address input (AH) of first memory array 321 while enabled, thereby allowing concatenation of the first and second address portions on address/data lines 312 to address first memory array 321.

Tristate gates 914 may be coupled to pass a first address portion on address/data lines 314 to a latch 944 in response to the active /ADV control signal. Latch 944 may be coupled to latch and output the first address portion to the low-order address input (AL) of second memory array 322 in response to the active /HADV control signal through AND gate 952, OR gate 954, and latch 956. Latch 944 may comprise, for example, D-type flip-flops. Tristate gates 914 may be coupled to pass a second address portion on address/data lines 314 to a second input (I2) of MUX 934 while enabled. MUX 934 may be coupled to output the second address portion on its second input (I2) to the high-order address input (AH) of second memory array 322 in response to the active /HADV control signal through AND gate 936, thereby allowing concatenation of the first and second address portions on address/data lines 314 to address second memory array 322.

Figure 7:
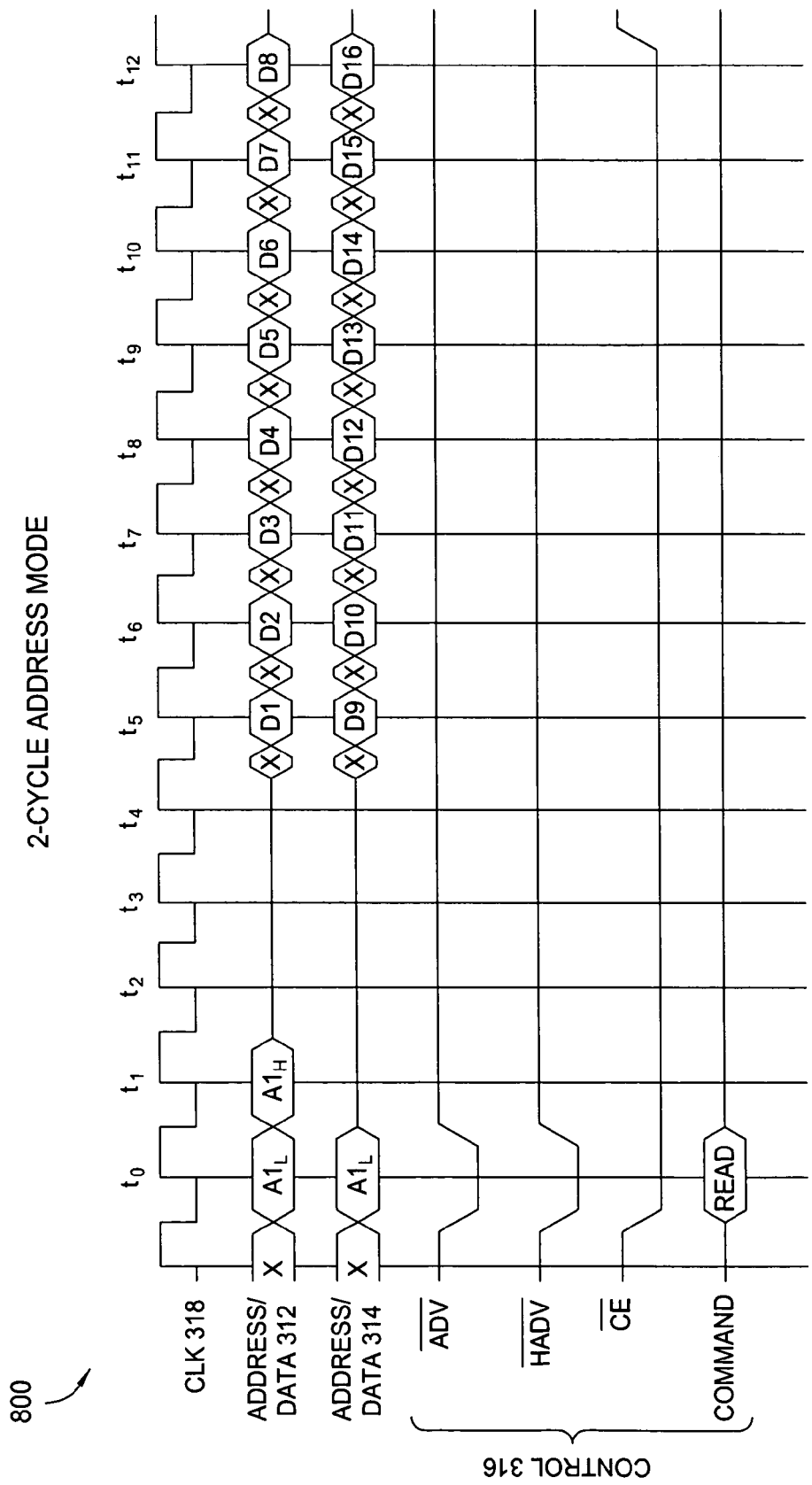
FIG. 7 illustrates, for one or more embodiments, an example multiple address read access timing diagram for the memory device of FIG. 3.

As illustrated in the timing diagram 800 of FIG. 7 for an exemplary read access using a two-cycle address mode, the first and second address portions of the first and second addresses may be latched in sequential clock cycles. Again, assuming 16-bit memory arrays 321 and 322 and a 4-cycle latency after the second address is presented at cycle t1, 32 bytes of data (16 bytes each from different address locations) may be accessed in 13 clock cycles. When compared to the 20 clock cycles required to read 32 bytes of data using the single-cycle address mode, this represents a significant reduction in latency. Thus, the multi-cycle addressing mode is particularly advantageous when accessing data at disparate memory locations.

Figure 8:
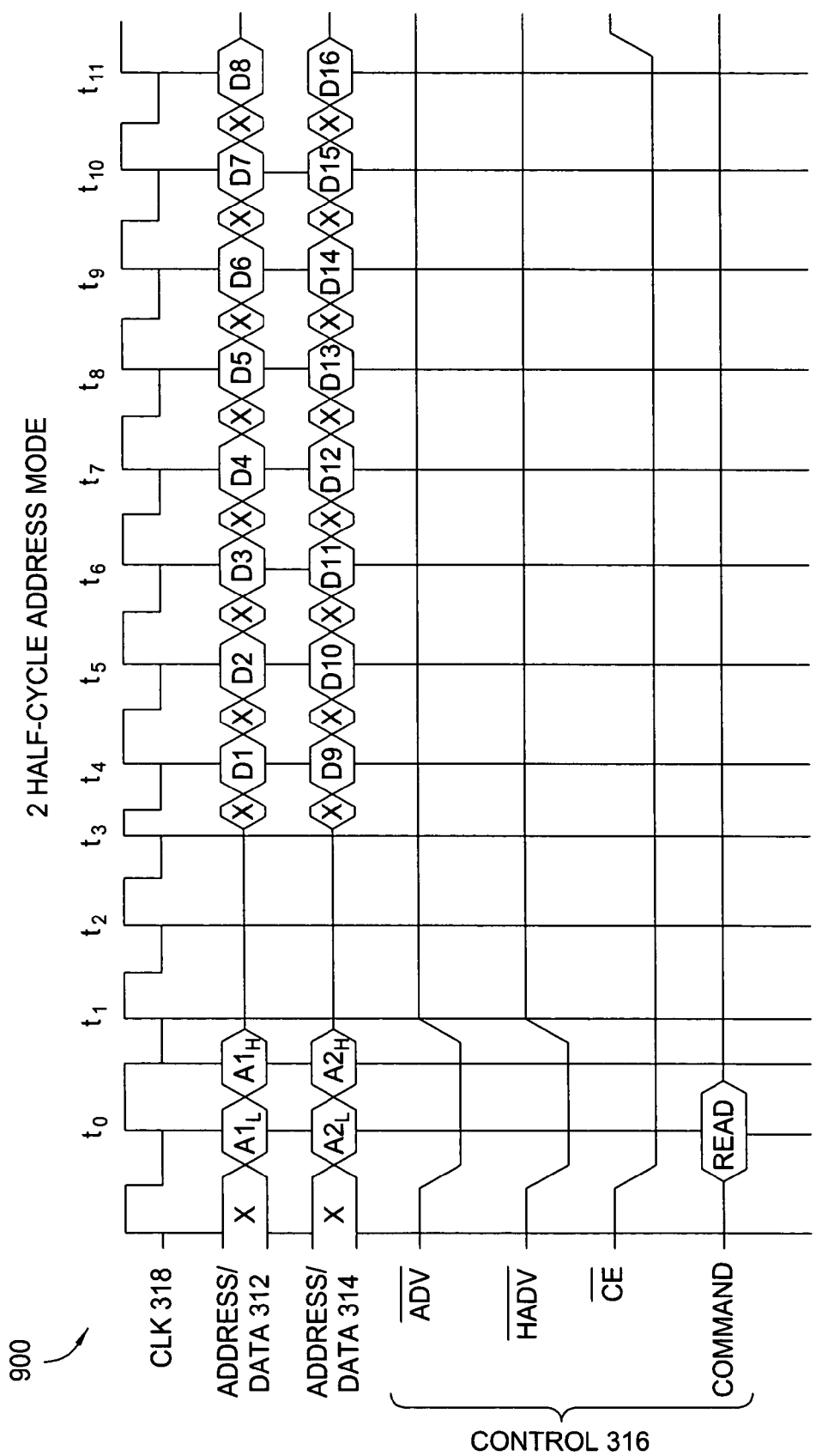
FIG. 8 illustrates, for one or more embodiments, another example multiple address read access timing diagram for the memory device of FIG. 3.

As illustrated in the timing diagram 900 of FIG. 8 for an exemplary read access using a two-cycle address mode, the first and second address portions of the first and second addresses may alternatively be latched in sequential clock edges within a single clock cycle. For example, first and second address portions may be clocked in on a rising and falling edges, respectively, of a single clock cycle. This addressing mode may be considered a "2 half-cycle address mode" and, as illustrated, may further reduce access time by another clock cycle (e.g. from 13 clock cycles to 12 clock cycles for the example above).

ALTERNATIVE EMBODIMENTS

Embodiments of multiple-address mode have been described in connection with addressing first memory array 321 using address portions received over address/data lines 312 and addressing second memory array 322 using address portions received over address/data lines 314. However, for some embodiments, multiple portions of both the first and second addresses may be received over both the first and second address/data lines 312-314. For example, in a first clock cycle, first and second portions of the first address may be received over the first and second address/data lines 312-314, respectively, while in a second clock cycle first and second portions of the second address may be received over the first and second address/data lines 312-314. Address generation circuitry may be modified accordingly to latch in the first and second addresses.

Although embodiments are described in connection with receiving address portions over address/data lines 312 and 314, memory device 320 for one or more embodiments may be coupled to receive one or more address portions over at least a portion of each of one or more other sets of lines (e.g., dedicated address lines) for use in addressing first memory array 321 and/or second memory array 322. Utilizing these dedicated address lines to provide some portion (e.g., a high order number of bits) of the first and second addresses may allow the first and second addresses to be received in a single clock cycle, further reducing latency.

As one example, memory device 320 may be coupled to receive a first address portion over address/data lines 312, a second address portion over address/data lines 314, and a third address portion over an additional set of lines. Memory device 320 may then address first memory array 321 using, for example, the first and third address portions and address second memory array 322 using, for example, the second and third address portions.

As another example, memory device 320 may be coupled to receive a first address portion over address/data lines 312, a second address portion over address/data lines 314, a third address portion over a first additional set of lines, and a fourth address portion over a second additional set of lines. Memory device 320 may then address first memory array 321 using, for example, the first and third address portions and address second memory array 322 using, for example, the second and fourth address portions.

CONCLUSION

Embodiments of the invention generally providing memory access using multiple sets of address/data lines to help increase data bandwidth to and from memory have therefore been described. While the foregoing is directed to such embodiments, other and further embodiments of the invention may be devised without departing from the basic scope thereof, and the scope thereof is determined by the claims that follow.

What is claimed is:

1. A method for accessing a memory device having multiple address modes comprising:
    if a single address mode is selected,
        receiving multiple portions of a single address over first and second sets of lines,
        accessing first and second memory arrays of the memory device using the single address and using the first and second sets of lines to receive or transmit data; and
    if a multiple address mode is selected,
        receiving multiple portions of first and second addresses over the first and second sets of lines,
        accessing the first memory array using the first address and using the first set of lines to receive or transmit data, and
        accessing the second memory array using the second address and using the second set of lines to receive or transmit data,
    wherein receiving multiple portions of first and second addresses over first and second sets of lines in the multiple address mode comprises:
        receiving first and second portions of the first address over the first set of lines in sequential clock cycles; and
        receiving first and second portions of the second address over the second set of lines in a sequential clock cycles.

2. A method for accessing a memory device having multiple address modes comprising:
    if a single address mode is selected,
        receiving multiple portions of a single address over first and second sets of lines,
        accessing first and second memory arrays of the memory device using the single address and using the first and second sets of lines to receive or transmit data; and
    if a multiple address mode is selected,
        receiving multiple portions of first and second addresses over the first and second sets of lines,
        accessing the first memory array using the first address and using the first set of lines to receive or transmit data, and accessing the second memory array using the second address and using the second set of lines to receive or transmit data, wherein receiving multiple portions of first and second addresses over first and second sets of lines in the multiple address mode comprises:

receiving first and second portions of the first address over the first set of lines concurrent with sequential clock edges in a single clock cycle; and receiving first and second portions of the second address over the second set of lines concurrent with the sequential clock edges in the single clock cycle.

3. A method for accessing a memory device having multiple address modes comprising:

if a single address mode is selected, receiving multiple portions of a single address over first and second sets of lines, accessing first and second memory arrays of the memory device using the single address and using the first and second sets of lines to receive or transmit data; and if a multiple address mode is selected, receiving multiple portions of first and second addresses over the first and second sets of lines, accessing the first memory array using the first address and using the first set of lines to receive or transmit data, and accessing the second memory array using the second address and using the second set of lines to receive or transmit data, wherein receiving multiple portions of first and second addresses over first and second sets of lines comprises:

receiving first and second portions of the first address over the first set of lines in sequential clock cycles; and receiving first and second portions of the second address over the second set of lines in sequential clock cycles.

4. A method for accessing a memory device having multiple address modes comprising:

if a single address mode is selected, receiving multiple portions of a single address over first and second sets of lines, accessing first and second memory arrays of the memory device using the single address and using the first and second sets of lines to receive or transmit data; and if a multiple address mode is selected, receiving multiple portions of first and second addresses over the first and second sets of lines, accessing the first memory array using the first address and using the first set of lines to receive or transmit data, and accessing the second memory array using the second address and using the second set of lines to receive or transmit data, wherein receiving multiple portions of first and second addresses over first and second sets of lines comprises:

receiving first and second portions of the first address over the first and second sets of lines in a first clock cycle; and receiving first and second portions of the second address over the first and second sets of lines in a second clock cycle.

5. An apparatus comprising:

first and second independently addressable memory arrays;

first and second sets of address/data lines; and circuitry configured to, in a first address mode, receive multiple portions of a single address over the first and second sets of address/data lines, access the first and second memory arrays of the memory device using the single address and using the first and second sets of address/data lines to receive or transmit data, and in a second address mode, receive multiple portions of first and second addresses over the first and second sets of address/data lines, access the first memory array using the first address and using the first set of address/data lines to receive or transmit data, and access the second memory array using the second address and using the second set of address/data lines to receive or transmit data, wherein the circuitry is configured to, in the second address mode:

receive first and second portions of the first address over the first set of lines in sequential clock cycles; and receive first and second portions of the second address over the second set of lines in sequential clock cycles.

6. An apparatus comprising:

first and second independently addressable memory arrays;

circuitry to receive multiple portions of first and second addresses over first and second sets of lines;

circuitry to access the first memory array using the first address and the first set of lines to receive or transmit data; and circuitry to access the second memory array using the second address and the second set of lines to receive or transmit data, wherein:

the circuitry to access the first memory array is configured to generate the first address using first and second portions of the first address received over the first set of lines in sequential clock cycles; and the circuitry to access the second memory array is configured to generate the second address using first and second portions of the second address received over the second set of lines in sequential clock cycles.

7. An apparatus comprising:

first and second independently addressable memory arrays;

circuitry to receive multiple portions of first and second addresses over first and second sets of lines;

circuitry to access the first memory array using the first address and the first set of lines to receive or transmit data; and circuitry to access the second memory array using the second address and the second set of lines to receive or transmit data, wherein:

the circuitry to access the first memory array is configured to generate the first address using an address portion received over a set of dedicated address lines; and the circuitry to access the second memory array is configured to generate the second address using the address portion received over the set of dedicated address lines.

8. A system comprising:

one or more processors;

a memory controller; and a memory device comprising first and second memory arrays and circuitry configured to:

when the memory device is in a first mode of operation, receive from the memory controller multiple portions of a single address over first and second sets of address/data lines, access the first and second memory arrays of the memory device using the single address and using the first and second sets of address/data lines to receive or transmit data, and when the memory device is in a second mode of operation, receive from the memory controller multiple portions of first and second addresses over the first and second sets of address/data lines, access the first memory array using the first address and using the first set of address/data lines to receive or transmit data, and access the second memory array using the second address and using the second set of address/data lines to receive or transmit data, wherein the memory device circuitry is configured to, when the memory device is in the second mode of operation:

receive from the memory controller first and second portions of the first address over the first set of lines in sequential clock cycles; and receive from the memory controller first and second portions of the second address over the second set of lines in sequential clock cycles.

* * * * *